(12) United States Patent
Spadaccini et al.

(10) Patent No.: US 7,334,407 B2
(45) Date of Patent: Feb. 26, 2008

(54) METHOD OF SUPPRESSING COKE IN ENDOTHERMIC FUEL PROCESSING

(75) Inventors: Louis J. Spadaccini, Manchester, CT (US); He Huang, Glastonbury, CT (US); David R. Sobel, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 761 days.

(21) Appl. No.: 10/805,786

(22) Filed: Mar. 22, 2004

(65) Prior Publication Data

US 2005/0204919 A1   Sep. 22, 2005

(51) Int. Cl.
*F23R 3/40* (2006.01)

(52) U.S. Cl. .................. 60/723; 60/734; 96/6

(58) Field of Classification Search .......... 60/39, 60/461, 723, 734; 95/54; 96/6
See application file for complete search history.

(56) References Cited

U.S. PATENT DOCUMENTS

| 3,751,879 A | 8/1973 | Allington |
| 3,928,961 A * | 12/1975 | Pfefferle .............. 60/723 |
| 5,232,672 A | 8/1993 | Spadaccini et al. |
| 5,407,468 A | 4/1995 | Mandrin |
| 5,504,256 A | 4/1996 | Bond et al. |
| 5,619,855 A | 4/1997 | Burrus |
| 5,876,604 A | 3/1999 | Nemser et al. |
| 5,888,275 A | 3/1999 | Hamasaki et al. |
| 5,992,920 A | 11/1999 | Bailey et al. |
| 6,253,554 B1 | 7/2001 | Kobayashi et al. |
| 6,258,154 B1 | 7/2001 | Berndt et al. |
| 6,315,815 B1 | 11/2001 | Spadaccini et al. |
| 6,425,998 B1 | 7/2002 | Cholewa |
| 6,647,730 B2 | 11/2003 | Liu |
| 6,672,072 B1 | 1/2004 | Giffin, III |
| 6,709,492 B1 | 3/2004 | Spadaccini et al. |
| 6,939,392 B2 | 9/2005 | Huang et al. |

FOREIGN PATENT DOCUMENTS

| JP | 09-235566 | 9/1997 |
| JP | 2004262721 | 9/2004 |

OTHER PUBLICATIONS

European Search Report dated Jun. 8, 2005.
Japanese Office Action mailed on Aug. 21, 2007.

* cited by examiner

*Primary Examiner*—L. J. Casaregola
(74) *Attorney, Agent, or Firm*—Carlson, Gaskey & Olds

(57) ABSTRACT

A fuel system for a propulsion system includes a fuel deoxygenating device and a catalytic module containing catalytic materials. The fuel deoxygenating device removes dissolved oxygen from the fuel to prevent formation of insoluble materials that can potentially foul the catalyst and block desirable catalytic reactions that increase the usable cooling capacity of an endothermic fuel.

20 Claims, 3 Drawing Sheets

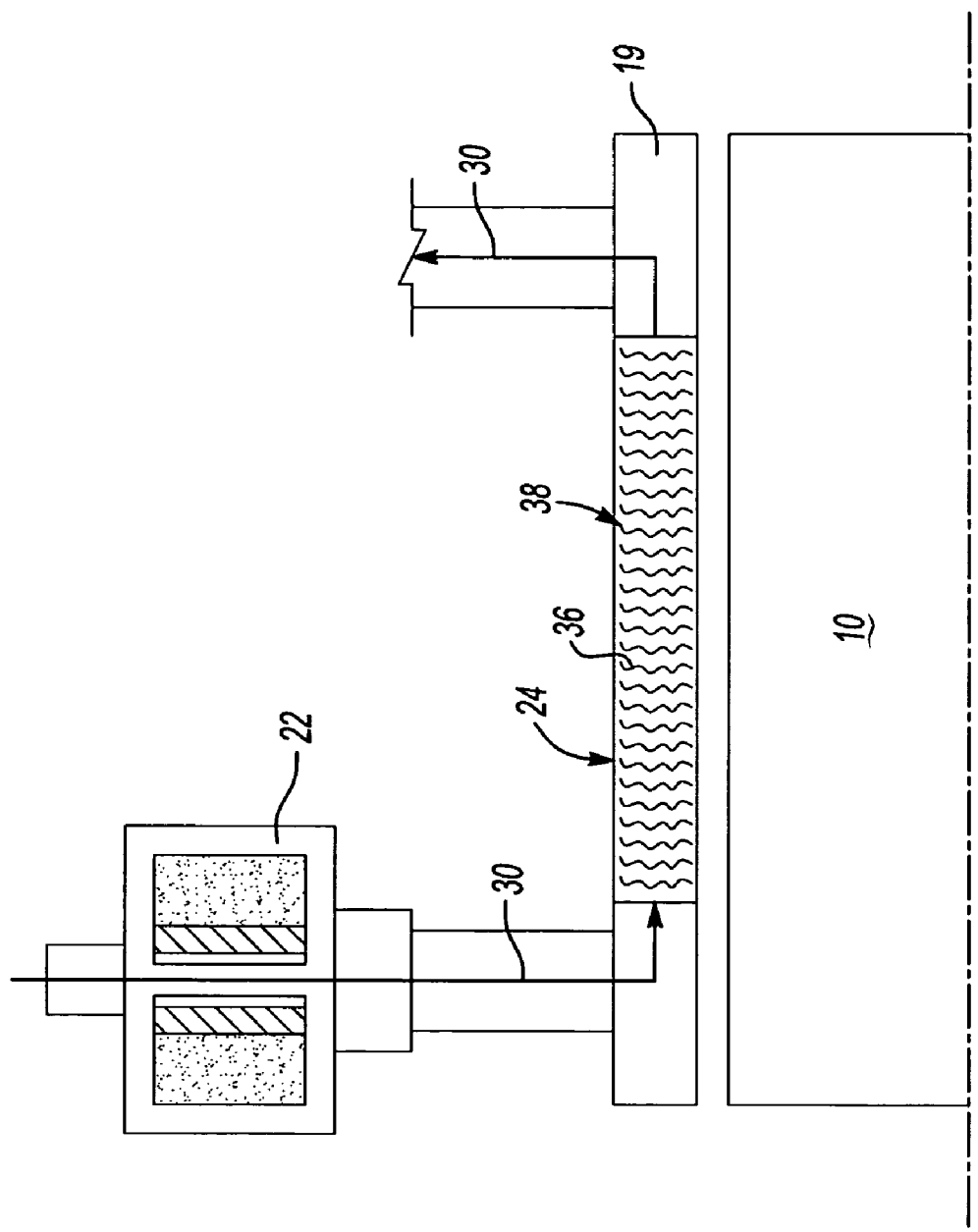

METHOD OF SUPPRESSING COKE IN ENDOTHERMIC FUEL PROCESSING

BACKGROUND OF THE INVENTION

This invention generally relates to a cooling system for a high-speed propulsion system, and specifically to a cooling system including a fuel deoxygenator and a catalyst for increasing the heat sink capability of a hydrocarbon fuel capable of undergoing endothermic reaction.

It is common practice to use fuel as a cooling medium for various systems onboard an aircraft. Higher engine operating temperatures increase cycle efficiency and reduce fuel consumption. The engine operating temperature is limited by the usable cooling capacity of the fuel. The cooling capacity of fuel can be increased by endothermic decomposition of the fuel into combustible products that may have improved ignition and burning characteristics.

Catalysts are known that promote decomposition of endothermic fuels into combustible products with lower molecular weights than the original fuel after absorbing a heat of reaction. However, thermo-oxidative reactions caused by dissolved oxygen within the fuel can cause formation of coke that foul the catalyst and prevent the preferred catalytic reactions.

At temperatures between approximately 250° F. to 800° F. dissolved oxygen within the fuel reacts to form coke precursors that initiate and propagate reactions that lead to coke deposit formation. At temperatures above approximately 800° F. the mechanism for formation of coke deposits is controlled by thermal cracking (pyrolysis) reactions where chemical bonds are broken forming coke. Reducing the amount of oxygen dissolved within the fuel decreases the rate of coke deposition at relatively lower temperatures and increases the usable cooling capacity of the fuel.

It is known how to remove dissolved oxygen within fuel with de-oxygenation devices. U.S. Pat. No. 6,315,815, and U.S. patent application Ser. No. 10/407,004 assigned to Applicant, disclose devices for removing dissolved oxygen using a gas-permeable membrane within the fuel system. As fuel passes along the permeable membrane, oxygen molecules in the fuel diffuse out of the fuel across the gas-permeable membrane. Removal of dissolved oxygen from the fuel only provides limited increases in usable cooling capacity. Increasing performance demands require further increases in the usable cooling capacity of aircraft fuels.

Accordingly, it is desirable to develop an endothermic fuel system that suppresses formation of coke deposits to prevent interference with desirable catalytic reactions at increased engine operating temperatures.

SUMMARY OF INVENTION

This invention is a fuel delivery system including a fuel deoxygenating device for removing dissolved oxygen from fuel to prevent formation of insoluble materials that potentially block desirable catalytic reactions thereby increasing the usable cooling capacity of an endothermic fuel.

The fuel delivery system includes the fuel deoxygenator for removing dissolved oxygen from the fuel before entering a catalytic device. The catalytic device initiates endothermic decomposition of the fuel into favorable combustible products with increased usable heat absorption capacity.

The fuel-deoxygenating device includes a permeable membrane supported by a porous substrate. An oxygen partial pressure differential created across the permeable membrane drives diffusion of oxygen from the fuel and across the permeable membrane. The dissolved oxygen is then exhausted away from the fuel. Removal of dissolved oxygen from the fuel substantially reduces the formation of insoluble materials or coke that is known to form at temperatures above about 250° F.

Prevention of coke formation prevents possible fouling of the catalytic device that could prevent initiation of endothermic decomposition. Endothermic decomposition occurs at temperatures well above the temperatures that cause coke formation caused by dissolved oxygen. The fuel-deoxygenating device prevents dissolved oxygen within the fuel from forming coke deposits that foul and prevent the desired endothermic decomposition of the fuel. Further, the fuel-deoxygenating device provides for substantial increases in usable cooling capacity of the fuel allowing higher engine operating temperatures.

Accordingly, the endothermic fuel delivery system of this invention includes a fuel-deoxygenating device that suppresses formation of coke deposits to prevent interference with desirable catalytic reactions at increased engine operating temperatures.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 5 is a schematic view of the catalyst and a fuel deoxygenator.

DETAILED DESCRIPTION OF THE PREFERRED EMBODIMENT

Figure 1:
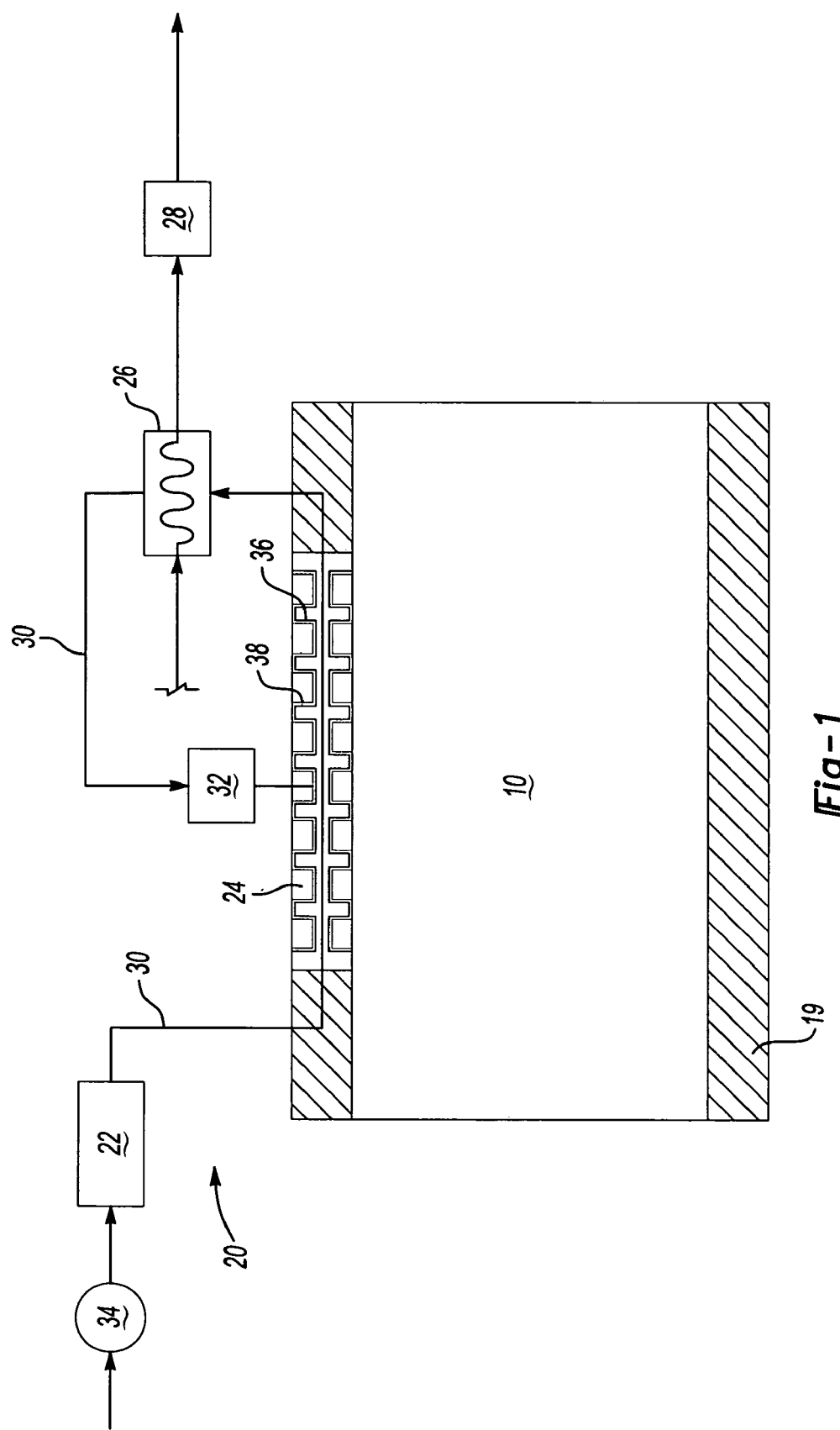
FIG. 1 is a schematic view of a propulsion system and fuel delivery system according to this invention.

Referring to FIG. 1, a propulsion system 10 includes a fuel delivery system 20. The fuel delivery system 20 includes a fuel deoxygenator 22 and a catalyst module 24. The fuel system 20 also includes a heat exchanger 26 for direct or indirect cooling of propulsion system components and other systems 28 by rejecting heat to the fuel. The propulsion system 10 is preferably a gas turbine engine, ramjet or scramjet engine for high-speed aircraft, although a worker with the benefit of this disclosure will recognize the benefits applicable to other known energy conversion devices. The other systems 28 can include cooling of bleed air or other fluids for cooling components of the propulsion system 10.

The catalyst module 24 includes a catalytic material 36 that promotes endothermic decomposition of the fuel. The catalytic material 36 can be a metal such as copper, chromium, platinum, rhodium, iridium, ruthenium, palladium, and any combination of these materials. Further, the catalytic material 36 may also be a zeolite. A worker having the benefit of this disclosure would understand the specific composition of catalyst required to break down the fuel into favorably combustible components.

Zeolites are preferred because they are more reactive and produce less insoluble products than the metals. As a result of the reduced amount of insoluble products produced greater usable cooling capacity is obtainable in the endothermic fuel. The specific type of zeolite can include faujasites, chabazites, mordenites, silicalites, or any other type of zeolite known to catalytically crack fuel.

Preferably, the catalytic material 36 is supported on a honeycomb structure 38 disposed within the catalytic module 24. However, the catalytic material may be supported on granules, extrudates, monoliths, or other known catalyst support structures. The catalytic materials required reaction temperatures of between about 1000° F. and 1500° F. Lower temperatures provide for lower conversions and therefore lower usable heat sink capacity of the fuel.

The catalytic module 24 is disposed adjacent heat producing components of the propulsion system 10. Preferably, the catalytic module 24 is disposed within a housing 19 of the engine assembly 10. The heat generated by the propulsion system 10 elevates the temperature of the catalytic module 24 to temperatures required to initiate catalytic reactions that cause the endothermic decomposition of the fuels.

The temperature of the catalytic module 24 can also be elevated by the heat of the fuel itself. The fuel flowing through the catalytic module 24 is used to absorb heat from other systems. The heat absorbed will elevate the temperature of the catalytic module 24 to temperatures providing optimum operation. Further, it is within the contemplation of this invention to heat the catalytic module 24 by any means or device.

Fuels have long been used as coolants on aircraft because of the capacity to absorb heat. The capacity to absorb heat without chemical reaction is known as the fuels physical heat sink. The physical heat sink is limited by formation of insoluble materials formed as a result of dissolved oxygen reacting with components of the fuel in the presence of heat.

The formation of insoluble materials related to the amount of dissolved oxygen within the fuel occurs at temperatures lower than those required for the catalytic reactions. Disadvantageously, the formation of insoluble materials can create a layer of coke deposits on the catalytic material 36. The layer of coke deposits prevents a substantial portion of fuel from contacting the catalytic material 28, thereby preventing the desired catalytic reactions. The fuel delivery system 20 of this invention includes the fuel deoxygenator 22 that removes a substantial amount of dissolved oxygen from the fuel. The removal of dissolved oxygen delays the formation of coke deposits typically formed at temperatures below about 800° F. At increased temperatures catalytic reactions begin cracking the fuel into desired components with favorable combustion properties and greater heat absorption capabilities.

Figure 2:
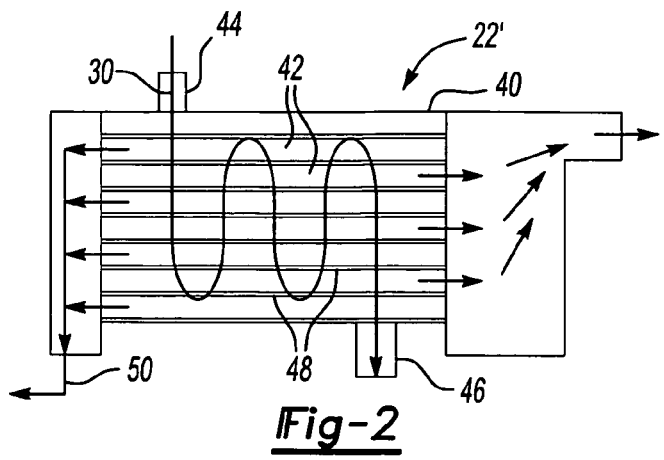
FIG. 2 is a schematic view of a fuel deoxygenator according to this invention.

Referring to FIG. 2, a schematic view of a fuel deoxygenator 22' according to this invention is shown and includes a plurality of tubes 42 disposed within a housing 40. The fuel 30 is flowed around the tubes 42 from an inlet 44 to an outlet 46. Tubes 42 include a composite permeable membrane 48 that absorbs oxygen molecules dissolved within the fuel 30. A strip gas 50 flowing through the tubes 42 creates a partial pressure differential across the composite permeable membrane 48 that draws dissolved oxygen from the fuel 30 into the tubes 42 and out with the strip gas 50. Oxygen is then removed from the strip gas 50 and exhausted from the system 20. The strip gas 50 may than be recycled through the fuel deoxygenator 22'. Deoxygenated fuel exits through the outlet 46 and into the catalyst module 24 for catalytic reaction with the now deoxygenated fuel 30.

Figure 3:
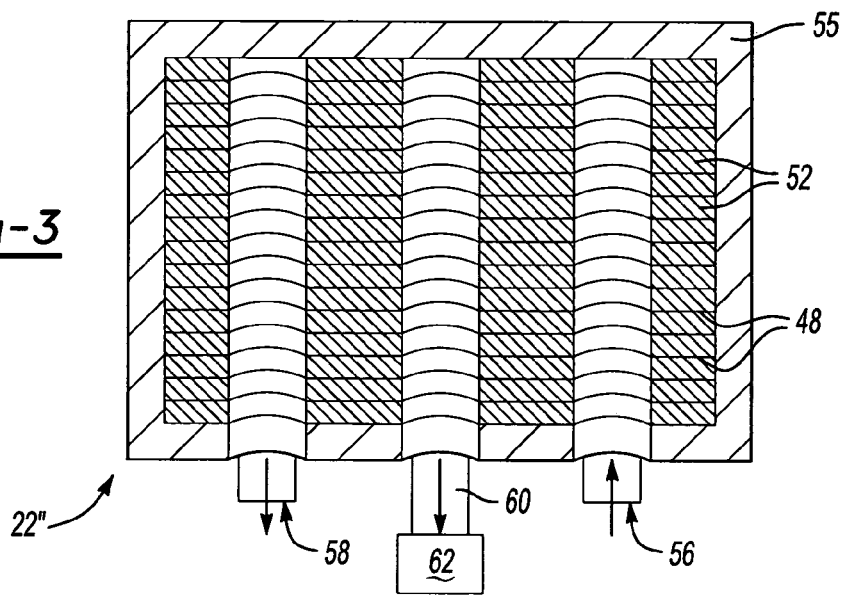
FIG. 3 is a schematic view of another deoxygenator according to this invention.

Referring to FIG. 3, another embodiment of a fuel deoxygenator 22" is shown and includes a series of fuel plates 52 stacked one on top of the other. The composite permeable membrane 48 is included on each of the fuel plates 52 to define a portion of fuel passages 54. Fuel enters through an inlet 56 and exists through an outlet 58. An opening 60 is open to a vacuum source 62. Fuel 30 passes within the fuel passages 54 defined by the stacked fuel plates 52. The fuel plates 52 are disposed within the housing 55 that defines the inlet 56 and the outlet 58. The use of the fuel plates 52 allows for the adaptation of the fuel deoxygenator 22" to various applications by the addition or subtraction of fuel plates 52. Although embodiments of fuel deoxygenators are shown and described, a worker skilled in the art with the benefit of this application would understand that other configurations of fuel deoxygenators are within the contemplation of this invention.

Figure 4:
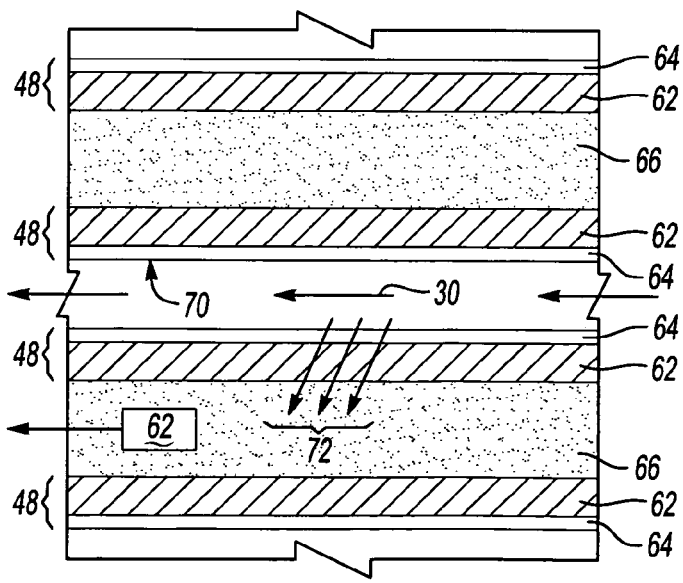
FIG. 4 is a schematic view of a permeable membrane according to this invention.

Referring to FIG. 4, the composite permeable membrane 48 is shown in cross-section and preferably includes a permeable layer 62 disposed over a porous backing 64. The porous backing 64 supplies the required support structure for the permeable layer 62 while still allowing maximum oxygen diffusion from fuel. The permeable layer 62 is coated on to the porous backing 64 and a mechanical bond between the two is formed. The permeable layer 62 is preferably a 0.5-20 μm thick coating of Teflon AF 2400 over a 0.005-in thick porous backing 64 of polyvinylidene fluoride (PVDF) with a 0.25 μm pores size. Other supports of different material, thickness and pore size can be used that provide the requisite strength and openness.

Preferably the permeable layer 62 is Dupont Telfon AF amorphous fluoropolymer however other materials known to workers skilled in the art are within the contemplation of this invention, such as Solvay Hyflon AD perfluorinated glassy polymer and Asahi Glass CYTOP polyperfluorobutenyl vinyl ether. Each composite permeable membrane 48 is supported on a porous substrate 66. The porous substrate 66 is in communication with the vacuum source 62 to create an oxygen partial pressure differential across the composite permeable membrane 48.

In operation a partial pressure differential is created by the vacuum source 62 between a non-fuel side 68 of the permeable membrane 48 and a fuel side 70. Oxygen indicated at arrows 72 diffuses from fuel 30 across the composite permeable membrane 48 and into the porous substrate 66. From the porous substrate 66 the oxygen 72 is vented out of the fuel system 20.

Referring to FIG. 5, the catalyst module 24 is mounted within a housing 19 of the propulsion system 10. Heat generated by the propulsion system 10 heats the catalytic material 36 and fuel 30 flowing therethrough to temperatures promoting the desired catalytic reactions. The catalytic reaction of the fuel increases the heat absorption capability of the fuel and produces favorable combustible materials.

At lower temperatures, such as during initial start up of the propulsion system 10, coke formation is prevented by the removal of dissolved oxygen in the deoxygenator 22. As appreciated, without removing dissolved oxygen from fuels, coke deposits would form on the internal components of the fuel system 20. This includes the honeycomb structures 38 within the catalytic module 24. It is for this reason that widespread use of catalysts to provide endothermic decomposition fuels has not been practical. The use of the fuel deoxygenator 22 prevents fouling of the catalyst material 36 at lower temperatures, enabling beneficial catalytic reactions at elevated temperatures that increase the heat sink capability of an endothermic fuel. The increased heat sink capability enables operation of the propulsion system 10 at greater temperatures and greater efficiencies.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A propulsion system comprising:
    an energy conversion device; and
    a fuel delivery system comprising a fuel deoxygenator for removing a portion of dissolved gases from a fuel and a catalyst receiving fuel from the fuel deoxygenator and initiating endothermic decomposition of the fuel.

2. The assembly as recited in claim 1, wherein said fuel deoxygenator comprises a permeable membrane in contact with fuel flowing through a fuel passage.

3. The assembly as recited in claim 2, comprising a polytetraflourethylene coating disposed on a fuel side of said permeable membrane.

4. The assembly as recited in claim 2, comprising a porous substrate supporting said permeable membrane on a non-fuel side.

5. The assembly as recited in claim 4, comprising a device for creating a partial pressure differential between a fuel side of said permeable membrane and a non-fuel side to draw dissolved gasses out of fuel with said fuel passage.

6. The assembly as recited in claim 1, wherein said catalyst is exposed to a heat producing element.

7. The assembly as recited in claim 1, wherein said catalyst is heated by fuel flowing therethrough.

8. The assembly as recited in claim 1, comprising a housing adjacent said propulsion system, wherein said catalyst is mounted within said housing.

9. The assembly as recited in claim 1, wherein said catalyst comprises a metal.

10. The assembly as recited in claim 1, wherein said catalyst comprises a zeolite.

11. The assembly as recited in claim 1, wherein said catalyst initiates endothermic decomposition of said fuel.

12. A fuel delivery system for a propulsion system comprising:
    a fuel deoxygenator for removing a portion of dissolved gases from fuel; and
    a catalyst receiving fuel exiting said fuel deoxygenator and initiating endothermic decomposition of the said fuel.

13. The system as recited in claim 12, wherein fuel deoxygenator comprises a permeable membrane in contact with fuel flowing through a fuel passage.

14. The system as recited in claim 13, comprising an amorphous fluoropolymer coating disposed on a fuel side of said permeable membrane.

15. The system as recited in claim 13, comprising a porous substrate supporting said permeable membrane on a non-fuel side.

16. The system as recited in claim 13, comprising a device for creating a partial pressure differential between a fuel side of said permeable membrane and a non-fuel side to draw dissolved gasses out of fuel with said fuel passage.

17. The system as recited in claim 12, wherein said catalyst comprises a metal.

18. The system as recited in claim 12, wherein said catalyst comprises a zeolite.

19. The system as recited in claim 12, wherein said catalyst is mounted adjacent a heat producing element of said propulsion system.

20. The system as recited in claim 12, wherein said catalyst is heated by fuel flowing therethrough.

* * * * *

UNITED STATES PATENT AND TRADEMARK OFFICE
CERTIFICATE OF CORRECTION

| | | |
|---|---|---|
| PATENT NO. | : 7,334,407 B2 | Page 1 of 1 |
| APPLICATION NO. | : 10/805786 | |
| DATED | : February 26, 2008 | |
| INVENTOR(S) | : Spadaccini et al. | |

It is certified that error appears in the above-identified patent and that said Letters Patent is hereby corrected as shown below:

Claim 12, Column 6, line 15: delete "said"

Signed and Sealed this

Fourth Day of November, 2008

JON W. DUDAS
*Director of the United States Patent and Trademark Office*